(12) United States Patent
McFadden

(10) Patent No.: US 7,507,938 B2
(45) Date of Patent: Mar. 24, 2009

(54) SPEED COOKING OVEN WITH SLOTTED MICROWAVE ANTENNA

(75) Inventor: David McFadden, Lexington, MA (US)

(73) Assignee: Turbochef Technologies, Inc., Atlanta, GA (US)

( * ) Notice: Subject to any disclaimer, the term of this patent is extended or adjusted under 35 U.S.C. 154(b) by 0 days.

(21) Appl. No.: 10/576,847

(22) PCT Filed: Oct. 21, 2004

(86) PCT No.: PCT/US2004/035252

§ 371 (c)(1),
(2), (4) Date: Mar. 19, 2007

(87) PCT Pub. No.: WO2005/041672

PCT Pub. Date: May 12, 2005

(65) Prior Publication Data

US 2007/0194011 A1    Aug. 23, 2007

Related U.S. Application Data

(63) Continuation-in-part of application No. 10/614,479, filed on Jul. 7, 2003, now Pat. No. 6,874,495, which is a continuation-in-part of application No. 10/614,268, filed on Jul. 7, 2003, which is a continuation-in-part of application No. 10/614,710, filed on Jul. 7, 2003, which is a continuation-in-part of application No. 10/614,532, filed on Jul. 7, 2003.

(60) Provisional application No. 60/614,877, filed on Sep. 30, 2004, provisional application No. 60/551,268, filed on Mar. 8, 2004, provisional application No. 60/550,578, filed on Mar. 5, 2004, provisional application No. 60/513,110, filed on Oct. 21, 2003, provisional application No. 60/394,216, filed on Jul. 5, 2002.

(51) Int. Cl.
H05B 6/70 (2006.01)
H05B 6/80 (2006.01)

(52) U.S. Cl. .................. 219/681; 219/696; 219/746; 219/751; 219/400

(58) Field of Classification Search ......... 219/745–751, 219/756, 691, 695–696, 681, 400
See application file for complete search history.

(56) References Cited

U.S. PATENT DOCUMENTS 2,563,253 A    8/1951 Levin (Continued)

FOREIGN PATENT DOCUMENTS

DE    25 57 867 A    6/1977

(Continued)

OTHER PUBLICATIONS

Non-Final Office Action mailed Sep. 4, 2007 in related U.S. Appl. No. 11/392,050.

(Continued)

*Primary Examiner*—Philip H Leung
(74) *Attorney, Agent, or Firm*—Dean W. Russell; Kilpatrick Stockton LLP

(57) ABSTRACT

A speed cooking oven (1) has a cooking cavity (2), and a microwave waveguide (20*a*) with slotted antenna (70) which efficiently emits electromagnetic energy (51*a*) to assist with the speed cooking of food product (10).

40 Claims, 9 Drawing Sheets

U.S. PATENT DOCUMENTS

| | | | |
|---|---|---|---|
| 2,704,802 A | 3/1955 | Blass et al. | |
| 3,210,511 A | 10/1965 | Smith | |
| 3,548,152 A | 12/1970 | Klepzig | |
| 3,813,216 A | 5/1974 | Baur et al. | |
| 3,828,760 A | 8/1974 | Farber et al. | |
| 4,154,861 A | 5/1979 | Smith | |
| 4,283,614 A | 8/1981 | Tanaka et al. | |
| 4,327,279 A | 4/1982 | Guibert | |
| 4,337,384 A | 6/1982 | Tanaka et al. | |
| 4,338,911 A | 7/1982 | Smith | |
| 4,350,504 A | 9/1982 | Diachuk | |
| 4,409,453 A | 10/1983 | Smith | |
| 4,431,889 A | 2/1984 | Saponara et al. | |
| 4,464,554 A | 8/1984 | Bakanowski et al. | |
| 4,480,164 A | 10/1984 | Dills | |
| 4,494,525 A | 1/1985 | Albertsen | |
| 4,737,373 A | 4/1988 | Forney | |
| 4,752,268 A | 6/1988 | Kataoka et al. | |
| 4,786,774 A | 11/1988 | Kaminaka | |
| 4,849,597 A | 7/1989 | Waigand | |
| 4,924,763 A | 5/1990 | Bingham | |
| 4,958,412 A | 9/1990 | Stanek | |
| 4,965,435 A | 10/1990 | Smith et al. | |
| 5,025,775 A | 6/1991 | Crisp | |
| 5,161,889 A | 11/1992 | Smith et al. | |
| 5,166,487 A | 11/1992 | Hurley et al. | |
| 5,277,105 A | 1/1994 | Bruno et al. | |
| 5,369,250 A | 11/1994 | Meredith | |
| 5,401,940 A | 3/1995 | Smith et al. | |
| 5,676,870 A | 10/1997 | Wassman et al. | |
| 5,717,192 A | 2/1998 | Dobie et al. | |
| 5,825,000 A | 10/1998 | Jun | |
| 5,826,496 A | 10/1998 | Jara | |
| 5,927,265 A | 7/1999 | McKee et al. | |
| 5,934,178 A | 8/1999 | Caridis et al. | |
| 5,994,672 A | 11/1999 | Mestnik | |
| 6,012,442 A | 1/2000 | Faraj | |
| 6,058,924 A | 5/2000 | Pool et al. | |
| 6,060,701 A | 5/2000 | McKee et al. | |
| 6,114,664 A | 9/2000 | Cook et al. | |
| 6,250,296 B1 | 6/2001 | Norris et al. | |
| 6,369,360 B1 | 4/2002 | Cook | |
| 6,376,817 B1 | 4/2002 | McFadden et al. | |
| 6,399,930 B2 | 6/2002 | Day et al. | |
| 6,403,937 B1 | 6/2002 | Day et al. | |
| 6,437,303 B1 * | 8/2002 | Dorr et al. | 219/679 |
| 6,472,640 B2 | 10/2002 | Brown et al. | |
| 6,481,999 B2 | 11/2002 | Knost | |
| 6,655,373 B1 | 12/2003 | Wiker | |
| 6,712,063 B1 | 3/2004 | Thorneywork | |
| 6,713,741 B2 | 3/2004 | Miller | |
| 6,874,495 B2 | 4/2005 | McFadden | |
| 7,055,518 B2 | 6/2006 | McFadden | |
| 7,087,872 B1 * | 8/2006 | Dobie et al. | 219/681 |
| 7,360,533 B2 | 4/2008 | McFadden | |
| 2004/0118392 A1 | 6/2004 | McFadden | |
| 2004/0123858 A1 | 7/2004 | McFadden | |
| 2004/0211765 A1 | 10/2004 | McFadden | |
| 2004/0216732 A1 | 11/2004 | McFadden | |
| 2005/0217503 A1 | 10/2005 | McFadden | |
| 2006/0169272 A1 | 8/2006 | McFadden et al. | |
| 2007/0137633 A1 | 6/2007 | McFadden | |
| 2007/0295322 A1 | 12/2007 | Dobie et al. | |
| 2008/0099008 A1 | 5/2008 | Bolton et al. | |
| 2008/0105133 A1 | 5/2008 | McFadden et al. | |
| 2008/0105135 A1 | 5/2008 | McFadden et al. | |
| 2008/0105136 A1 | 5/2008 | McFadden | |
| 2008/0105249 A1 | 5/2008 | McFadden et al. | |
| 2008/0106483 A1 | 5/2008 | McFadden et al. | |
| 2008/0206420 A1 | 8/2008 | McFadden | |
| 2008/0216812 A1 | 9/2008 | McFadden | |

FOREIGN PATENT DOCUMENTS

| | | |
|---|---|---|
| EP | 0 096 159 | 12/1983 |
| EP | 0429822AJ | 6/1991 |
| GB | 2043237 | 10/1980 |
| JP | 63-317068 A | 12/1988 |
| WO | WO2004/014139 | 2/2004 |
| WO | WO 2005/087009 | 9/2005 |
| WO | WO 2006/041814 | 4/2006 |
| WO | WO 2006/081202 | 8/2006 |
| WO | WO 2006/099394 | 9/2006 |

OTHER PUBLICATIONS

Non-Final Office Action mailed May 30, 2007 in related U.S. Appl. No. 11/098,280.
Notice of Allowance and accompanying materials in related U.S. Appl. No. 11/098,280.
Non-Final Office Action mailed Sep. 27, 2007 in related U.S. Appl. No. 10/614,532.
Final Office Action mailed May 30, 2007 in related U.S. Appl. No. 10/614,268.
U.S. Appl. No. 11/928,037, filed Oct. 30, 2007, McFadden.
Office Action dated Oct. 3, 2008 in related U.S. Appl. No. 10/591,074.
Office Action dated Aug. 19, 2008 in related U.S. Appl. No. 11/663,253.
Response dated Nov. 30, 2007 in related U.S. Appl. No. 10/614,268.
Office Action dated Feb. 4, 2008 in related U.S. Appl. No. 10/614,268.
Response dated Aug. 4, 2008 in related U.S. Appl. No. 10/614,268.
Office Action dated Sep. 4, 2007 in related U.S. Appl. No. 11/392,050.
Response dated Mar. 6, 2008 in related U.S. Appl. No. 11/392,050.
Office Action dated Jul. 22, 2008 in related U.S. Appl. No. 11/392,050.
Office Action dated Jan. 25, 2005 in related U.S. Appl. No. 10/614,532.
Response dated Jun. 27, 2005 in related U.S. Appl. No. 10/614,532.
Office Action dated Sep. 22, 2005 in related U.S. Appl. No. 10/614,532.
Response dated Mar. 22, 2006 in related U.S. Appl. No. 10/614,532.
Office Action dated Apr. 7, 2006 in related U.S. Appl. No. 10/614,532.
Response dated Oct. 10, 2006 in related U.S. Appl. No. 10/614,532.
Office Action dated Jan. 11, 2007 in related U.S. Appl. No. 10/614,532.
Response dated Jul. 11, 2007 in related U.S. Appl. No. 10/614,532.
Response dated Mar. 27, 2008 in related U.S. Appl. No. 10/614,532.
Office Action dated Jul. 23, 2008 in related U.S. Appl. No. 10/614,532.

* cited by examiner

SPEED COOKING OVEN WITH SLOTTED MICROWAVE ANTENNA

CROSS REFERENCE TO RELATED APPLICATIONS

The present application claims the benefit of: U.S. Provisional Application No. 60/513,110, filed Oct. 21, 2003, entitled "SLOTTED ANTENNA"; U.S. Provisional Application No. 60/551,268, filed Mar. 8, 2004, entitled "ANTENNA COVER"; U.S. Provisional Application No. 60/614,877 filed Sep. 30, 2004, entitled "SLOT ANTENNA"; and U.S. Provisional Application No. 60/550,578 filed Mar. 5, 2004, entitled "SPEED COOKING CONVEYOR OVEN".

The present application is also a continuation-in-part of U.S. application Ser. No. 10/614,479, filed Jul. 7, 2003, entitled "SPEED COOKING OVEN", currently pending, which claims the benefit of U.S. Provisional Application No. 60/394,216, entitled "RAPID COOKING OVEN", filed Jul. 5, 2002; a continuation-in-part of U.S. application Ser. No. 10/614,268, filed Jul. 7, 2003, entitled "MULTI RACK SPEED COOKING OVEN", currently pending, which claims the benefit of U.S. Provisional Application No. 60/394,216, entitled "RAPID COOKING OVEN", filed Jul. 5, 2002; a continuation-in-part of U.S. application Ser. No. 10/614,710, filed Jul. 7, 2003, entitled "SPEED COOKING OVEN WITH GAS FLOW CONTROL", currently pending, which claims the benefit of U.S. Provisional Application No. 60/394,216, entitled "RAPID COOKING OVEN", filed Jul. 5, 2002; a continuation-in-part of U.S. application Ser. No. 10/614,532, filed Jul. 7, 2003, entitled "SPEED COOKING OVEN", currently pending, which claims the benefit of U.S. Provisional Application No. 60/394,216, entitled "RAPID COOKING OVEN", filed Jul. 5, 2002.

The present application claims the benefit of PCT/US03/21225, entitled "SPEED COOKING OVEN" filed Jul. 5, 2003, currently pending, which claims the benefit of U.S. Provisional Application No. 60/394,216, entitled "RAPID COOKING OVEN", filed Jul. 5, 2002. All of these applications are incorporated herein by reference as if fully set forth.

This application is the U.S. national phase of International Application No. PCT/US04/35252 filed Oct. 21, 2004, the contents of which are incorporated herein by reference.

BACKGROUND

This invention pertains to the art of cooking appliances and, more particularly, to a speed cooking oven that utilizes slotted antenna for efficient distribution of microwave energy to a food product within the cooking chamber of the speed cooking oven. The invention has particular application to high speed cooking of food products at very high quality standards.

As used herein the terms "conventional cooking oven", "conventional cooking" and "conventional means", have the same meaning and refer to cooking at the quality level and at the speed that is currently widely utilized.

An important aspect of proper speed cooking is that the food product produced in a speed cook oven (in one seventh to one tenth the time of a conventional oven) is at or above the taste, appearance, quality and performance levels of the same food product cooked by conventional means.

Fast cooking ovens in the 2 to 3 times speed range have also been developed but are limited by inefficiencies. The first limitation is that the microwave launch system cannot equally illuminate multiple racks or pans of food. As a result, the efficiency of the microwave energy system must be purposely reduced (limited) in order to avoid hot spots and poor cooking quality. Second, in a top (roof) launch or bottom (floor) launch microwave system, cooking pans or other cooking vessels containing the food are situated directly above (in a bottom launch system) or directly below (in a top launch system) the microwave launch system. This obscures the microwave energy from the pans further away from the microwave illumination source. To compensate for the non-uniform illumination of the microwaves within the oven cavity, the design of the microwave system is purposely limited in order to achieve uniformity. As a result, most traditional microwave convection ovens are actually single rack ovens. Many of these top or bottom launch systems require either a mechanical device (generally referred to as a mode stirrer) or a turntable that rotates a platter or plate upon which the food rests (in a top launch microwave system), or in some cases both a mode stirrer and a rotating tray is utilized, to stir the electromagnetic energy field ("e-field") produced by the magnetrons. As used herein the terms "microwave energy", "electromagnetic energy", "e-field" and "e-fields" all have the same meaning.

A disadvantage of bottom launch microwave systems is that it is difficult to provide a microwave seal to the cavity floor (microwave energy launching through the oven floor via a circular waveguide) to prevent grease and liquid contamination of the waveguide chamber. A waveguide launcher sealing material must be utilized that allows for the passage of the e-field through the sealing material without any leakage of the seal. This is important because grease, water vapor or other particulate contamination of the microwave waveguide causes premature failure of the magnetron used to generate the e-field within the waveguide. Some speed cook ovens use an impingement approach where vertical air jets are generated from the oven cavity roof and floor simultaneously. The oven cavity bottom air jets (floor impingement jets) provide for bottom side cooking and browning while the oven cavity roof jets provide top side cooking and browning. In these devices, the e-field is launched from above the food product but this approach has disadvantages because the general oven construction is complex and the supply duct to the roof air plate must also act as a waveguide launcher for the e-fields. As used herein the terms "microwave waveguide", "waveguide", "waveguide launcher", "guide" and "launcher" have the same meaning. This requires that the roof jet plate be transparent to the e-field (e.g., ceramic plate with jet impingement holes) so that the e-field can be launched through the ceramic plate. Additionally, the floor ducts may become complex parts to manufacture in the event they are designed to be removed for cleaning and/or servicing.

Generally, metal cooking devices such as cooking pans, cookie sheets and other metal cookware are traditionally used in conventional cooking. Because e-fields cannot penetrate these metal devices, all of the microwave energy must enter the top and side surfaces of the food product and speed cooking is therefore slowed by the use of metal pans because e-fields cannot penetrate the metal pans but are instead deflected (redistributed) within the oven cavity by the metal pans. To overcome this disadvantage, some ovens utilize a top launch microwave system. The theory has been to provide microwave energy through the top surface of the food product, but this application of microwave energy applies excessive microwave energy to the top of the product, causing over cooking, producing a tough, rubbery food product. The overcooking problem is especially acute when cooking proteins, such as meat. In order to prevent this microwave overcook condition, one method historically utilized has been to reduce the microwave energy that is available for cooking the food product. The result of limiting the microwave energy to the food product is that the microwave energy is more evenly distributed over the cook cavity, but this reduction in applied microwave energy results in a slower cooking process, defeating the desire for a speed cooking oven.

Other methods of distributing microwave energy launch e-fields from below the food product. This is not optimum because microwave energy that is to enter the upper surface of the food product must bounce around within the oven cook cavity in a random and inefficient manner in order to enter the top side of the food.

Accordingly, it is an object of the present invention to provide efficient electromagnetic distribution for speed-cooking within single-rack and multiple rack ovens capable of cooking most food products 5 to 10 times faster than conventional cooking.

A further object is to provide such a speed-cooking oven with a continuous floor that is not interrupted by microwave launching systems and is easy for the user to clean and maintain.

Still another objects is to provide a speed cooking oven that is capable of high quality speed cooking within metal pans, pots, sheet pans and other metal cooking devices commonly found in residential and commercial kitchens.

It is a further object to provide such an oven with a microwave distribution system which is more cost effective to manufacture and easier to clean and maintain.

Yet another object is to provide such a microwave distribution system which is more reliable due to improvements and simplifications.

Another object is to provide such a microwave distribution system that eliminates line of sight slot antenna interference.

Other objectives, features and advantages will be apparent in the written description which follows.

SUMMARY

It has now been found that the above objects are obtained in a speed cooking oven provided with side wall mounted microwave systems utilizing slotted antenna The exemplary embodiment of the speed cook oven has a first conventional microwave waveguide with slotted antenna positioned along the left side wall, and a second conventional microwave waveguide with slotted antenna positioned along the right side wall of the oven cavity. The microwave feeds (slots) are centered above the cooking rack such that the bottom of the slots is approximately 0.5 inches to approximately 2.0 inches above the cooking rack. Standard 2.45 GHz microwave producing magnetrons, (tubes) are used, producing a maximum power level for the oven of approximately 1950 watts (delivered to the food) or approximately 950 watts per microwave magnetron. As used herein the terms "magnetron", "magnetron tube" and "tune" have the same meaning and the terms "slot" "slots" and "antenna" have the same meaning.

Other important design parameters that produce an efficient, yet inexpensive microwave distribution system include the slot length, slot width, the spacing between the slots, end space, angle of the slot relative to the long axis of the waveguide, the number of slots per waveguide and the slot orientation. Successful slot antenna designs produce Voltage Standing Wave Ratio less than 2, produce good water rise, and produce uniformity in microwave electromagnetic energy distribution and avoid the sink region of the magnetron tube.

Additional objects, features and advantages of the present invention will become readily apparent from the following detailed description of the exemplary embodiment thereof, when taken in conjunction with the drawings wherein like reference numerals refer to corresponding parts in the several views.

BRIEF DESCRIPTION OF THE SEVERAL VIEWS OF THE DRAWING

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE EXEMPLARY EMBODIMENT

The slotted antenna microwave distribution system of the speed cook oven of the exemplary embodiment is shown within a stand alone commercial cooking appliance, but this stand alone speed cooking appliance may exist in many other commercial and residential embodiments (e.g. counter-top oven, wall-oven, single rack oven, multi-rack oven, conveyor oven, oven utilized in vending operations and vending machines) because the speed cook oven is scalable up or scalable down. As used herein, the term scalable has the meaning that additional larger, smaller and varying embodiments can be developed for commercial and residential applications. Of course each embodiment or version may have different size characteristics, and require different voltages of electricity—as commercial power supplies are generally different for different types of commercial ovens and commercial power supplies are generally different than residential power supplies. Indeed the present invention may be practiced at many various commercial and residential power supply levels. The speed cooking oven of the present invention is therefore not limited to commercial uses only, not limited to the exemplary embodiment shown herein as a commercial countertop batch oven, and is also applicable for residential (home) use. With initial reference to FIGS. 1-5, a speed cook appliance 1 is schematically shown in the form of a stand alone commercial counter top speed cooking appliance. As used herein, the term "commercial" includes, but is not limited to, the commercial food service industry, restaurants, fast food establishments, speed service restaurants, convenience stores (to list a few) and other mass feeding establishments and the term "residential" refers, generally speaking, to residential applications (home use), although the term is not limited to residences only, but refers to non-commercial applications for the speed cooking oven.

Figure 1:
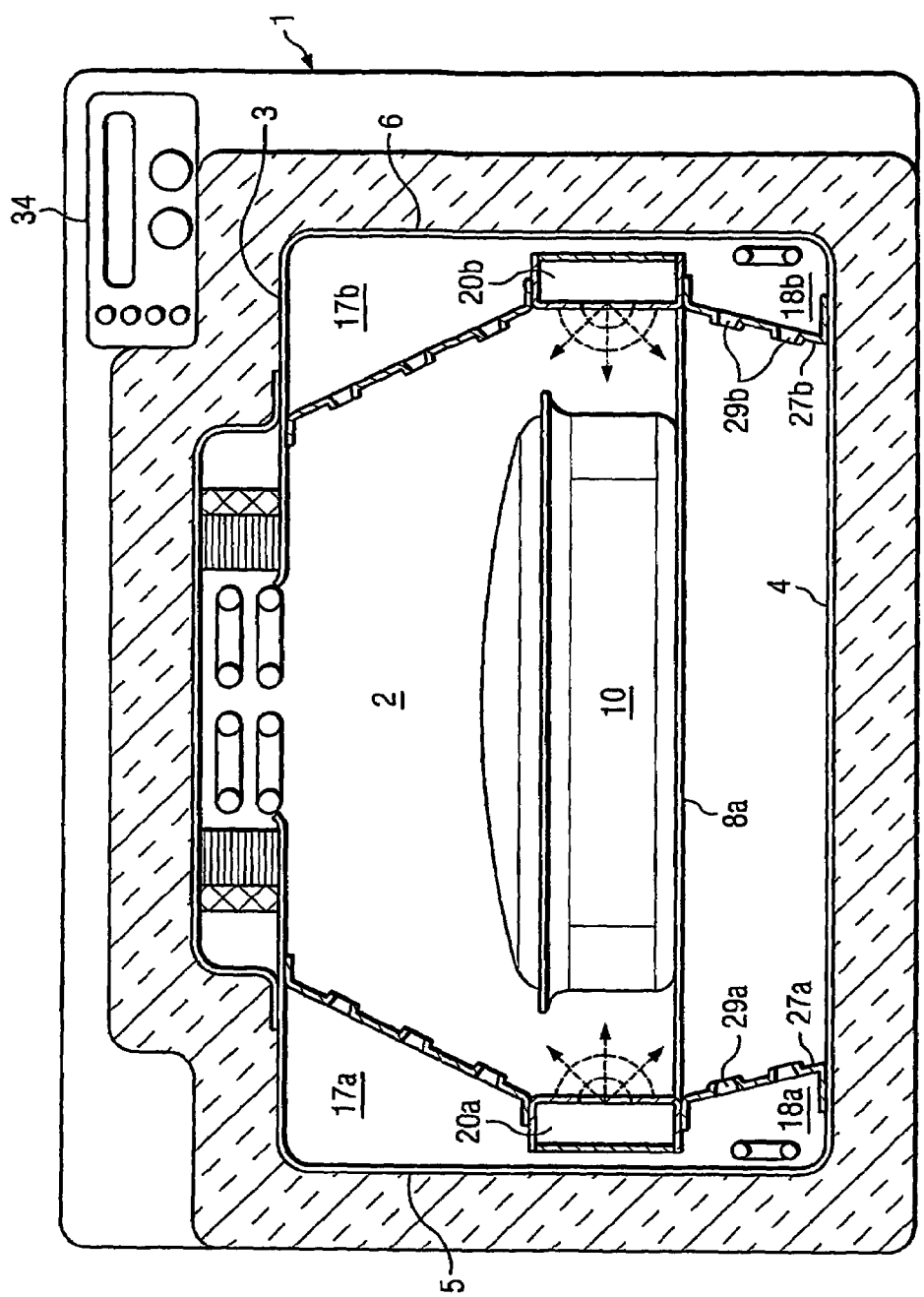
FIG. 1 is a front elevation of a single rack oven according to the present invention.
Figure 2:
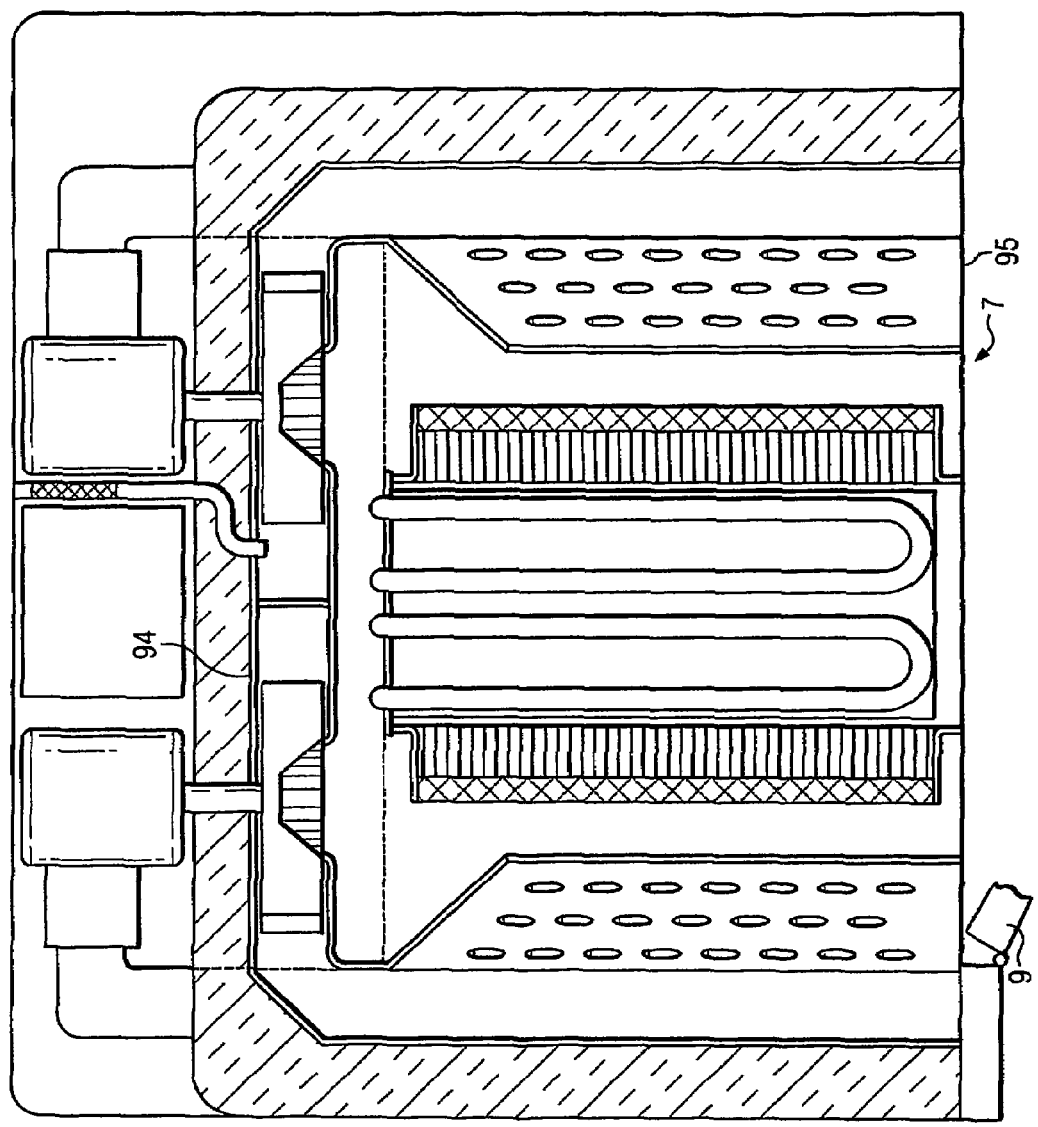
FIG. 2 is a top view of oven.

Appliance 1 includes an oven cavity 2 generally defined by, FIG. 1, a top wall 3, a bottom wall 4, left side wall 5 a right side wall 6, and FIG. 2, a back wall 94 and a front wall 95. Oven cavity 2 also has associated therewith an access opening 7, FIG. 2, through which food items 10 may be placed within oven cavity 2 upon cooking rack 8a, FIG. 1 and cooking racks 8a and 8b, FIG. 6. Although the exemplary embodiment is shown as a countertop oven with one rack 8a, supported by side walls 5 and 6, the oven may be made with multiple racks. The cooking rack 8a is shown as supported by side walls 5 and 6, but rack 8a may be a free-standing cooking rack not supported by the side walls. Cooking appliance 1 has a hinged door 9, FIG. 2, pivotally attached to the oven front for closing the cooking section opening 7 during cooking operation. Hinged door 9 may be swung between an open position wherein the door allows access to oven cavity 2 and a closed position wherein the door covers the opening into oven cavity 2. Although illustrated as a hinged door pivotally attached at the left side of the front of the oven, the door may be hinged on the right side, bottom side or top side. The present invention may also be practiced with a conveyor oven wherein entry into and exit from the cooking chamber is provided via a continuous conveyor, an indexing system, or other means to move the food product into and out of the oven cavity wherein no door may be swung open and closed during cooking. Alternatively doors may be utilized but are not necessarily required. The conveyor oven may consist one or more discrete cooking zones wherein the simplest zone design would process just one product at a time. Multi-zone designs of 'n' zones would have up to 'n' products in the oven at a given time. Because the speed cooking conveyor oven is a hybrid oven incorporating microwave energy, the need to isolate the microwave energy within the cooking tunnel is absolutely essential. In the United States, the Food and Drug Administration has established very strict microwave leakage levels for an oven (e.g. 1 miliwatt per centimeter squared for a new oven at the factory). Historically, conveyors that incorporated microwave power used long entrance and exit tunnels to attenuate the microwave leakage escaping from the open tunnel ends. These long tunnels not only require much additional floor space, but they work for cooking chamber heights of only a few inches. Such a short cooking cavity height greatly limits the use of varying food products to foods (e.g., sub sandwich) that can pass through such a limited cook chamber. Although this invention may be practiced with such tunnels, this invention also eliminates the need for long entrance and exit tunnels and short tunnel height relative to controlling microwave leakage may be utilized by employing an indexing conveyor approach coupled with tunnel doors. The indexing motion as described above permits the conveyor to come to a stop during the cooking cycle. As such doors can be closed at the open tunnel ends during the cooking cycle. Utilizing doors has the advantage of eliminating the need for the long entrance and exit tunnels and it eliminates the need for oven entrance height to only a few inches; and such a speed cooking conveyor oven can therefore easily handle products that are greatly than 6 inches tall.

Figure 3:
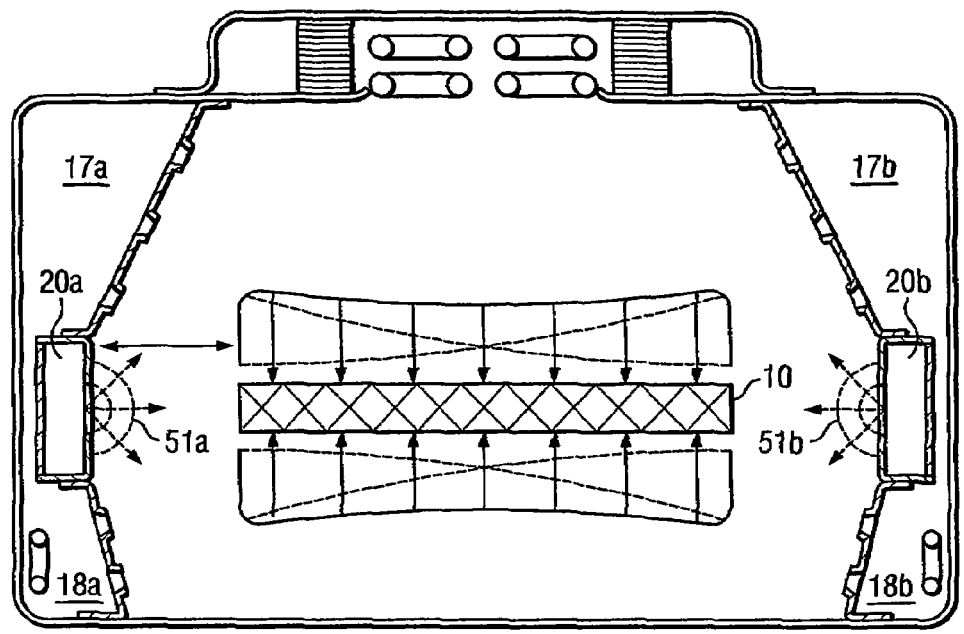
FIG. 3 is a front elevation view of microwave energy distribution.
Figure 6:
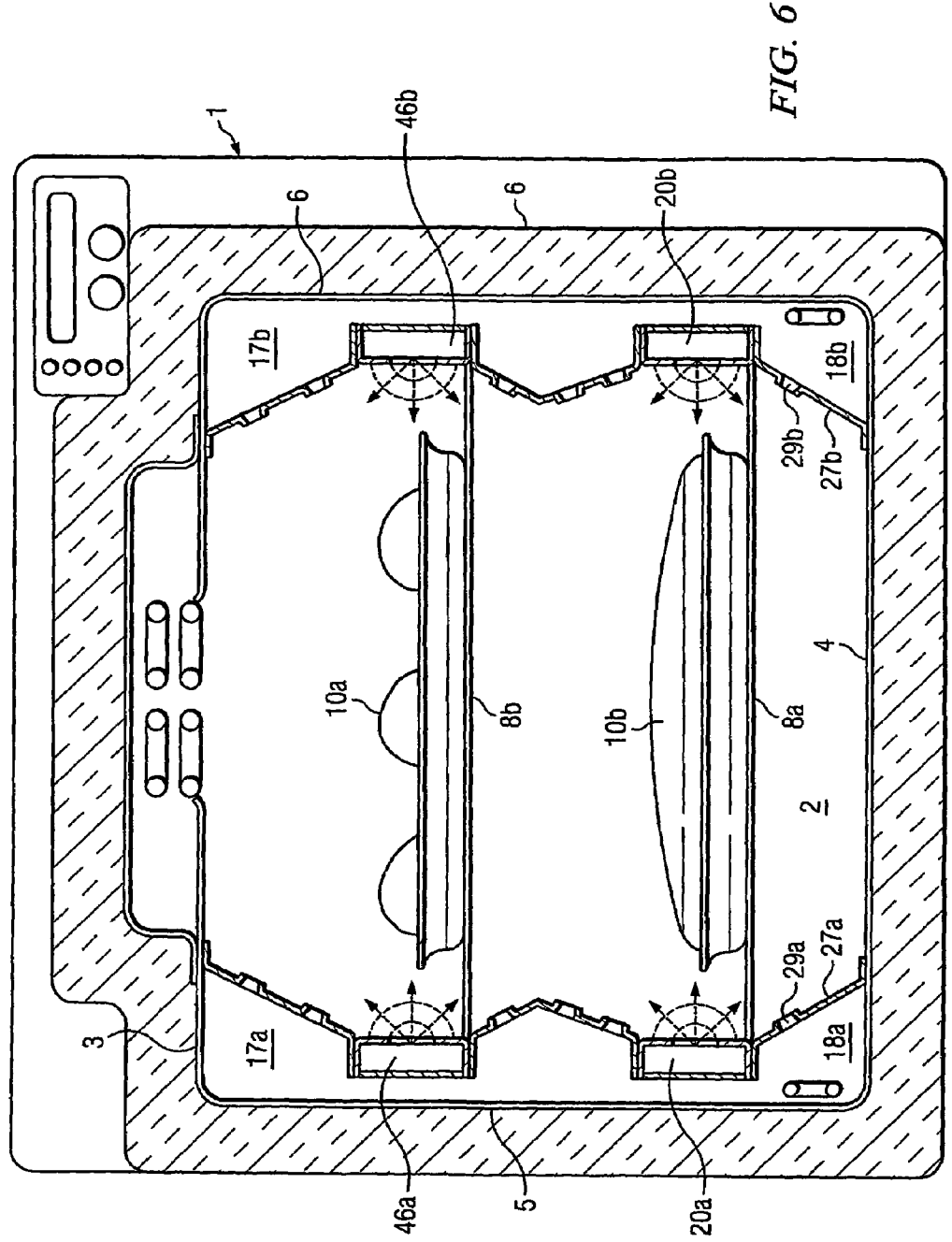
FIG. 6 is a front view of two rack oven.
Figure 7:
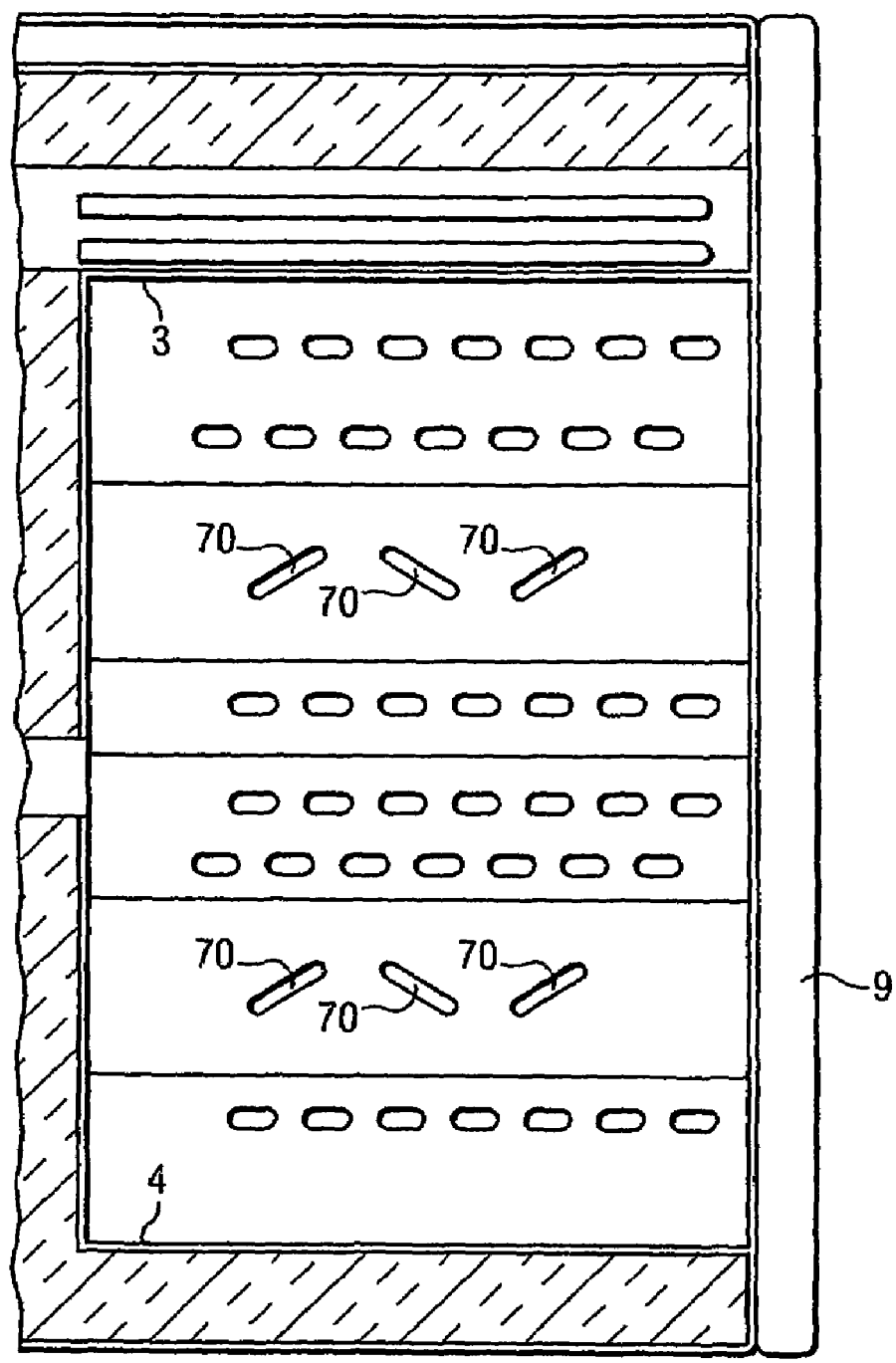
FIG. 7 is a front view of right side of two rack oven illustrating microwave system.
Figure 10:
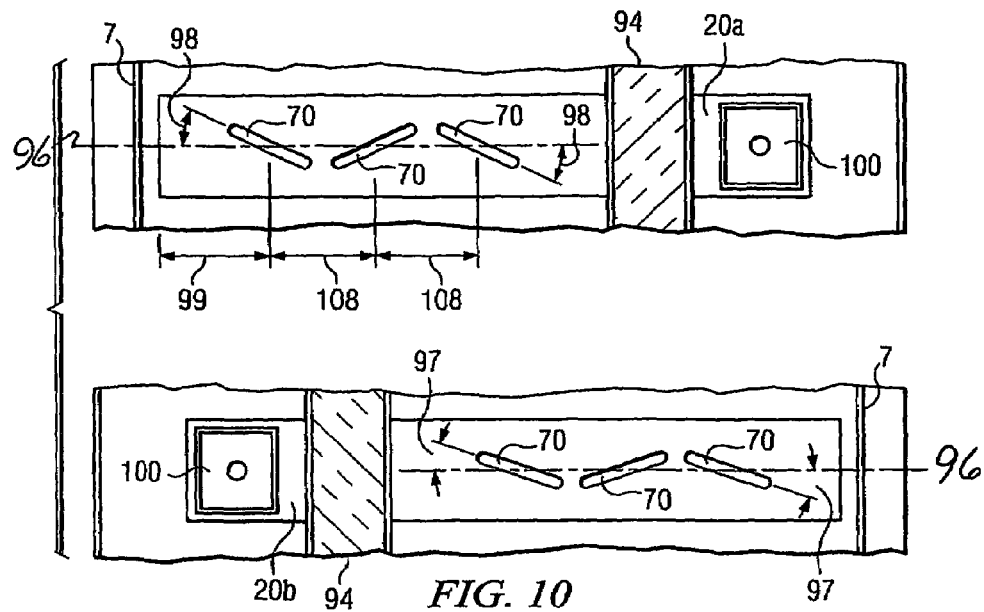
FIG. 10 is a front view of left and right waveguides illustrating differing slot angular orientation.

The oven of the present invention utilizes microwave energy to at least partially cook the food product, wherein microwave energy is emitted from magnetron 100, FIG. 10 into a waveguide chamber. The microwave energy propagates down the waveguide chamber and exits the chamber through slots 70 in the waveguide and couples with the food in the cooking chamber. The invention may be practiced with a single rack oven wherein two waveguides are employed, a two rack speed cooking oven in which four waveguides are utilized, or a multi rack oven wherein two waveguides are utilized per cooking rack. As seen in FIG. 1, left side microwave launching waveguide 20a is attached within oven cavity 2 to left side wall 5 between top left gas transfer section 17a and lower left gas transfer section 18a. Right side microwave launching waveguide 20b is attached within oven cavity 2 to right side wall 6 between top right gas transfer section 17b and lower right gas transfer section 18b. The waveguides are designed to distribute microwave power uniformly from the back to the front, and side to side within oven cook chamber 2. As shown in FIG. 3, such a configuration promotes uniform illumination of microwave energy to the right side and the left side of the cook chamber because the microwave energy from the side walls is additive over the product. The vertical distance above cavity bottom wall 4 of waveguides 20a and 20b is such that, under normal cooking conditions, approximately more than one third of the microwave energy is available below cooking rack 8a, with the balance of microwave energy available above cooking rack 8a, FIG. 1. FIG. 6 illustrates a two rack oven with waveguides 20a and 20b associated with rack 8a and waveguides 46a and 46b associated with rack 8b. The two rack oven as illustrated in FIG. 6 requires minor modification of the single rack speed oven in order to implement the second top rack, such modification having little or no impact upon the functioning of the microwave energy distribution throughout the cooking cavity 2, FIG. 6.

Figure 4:
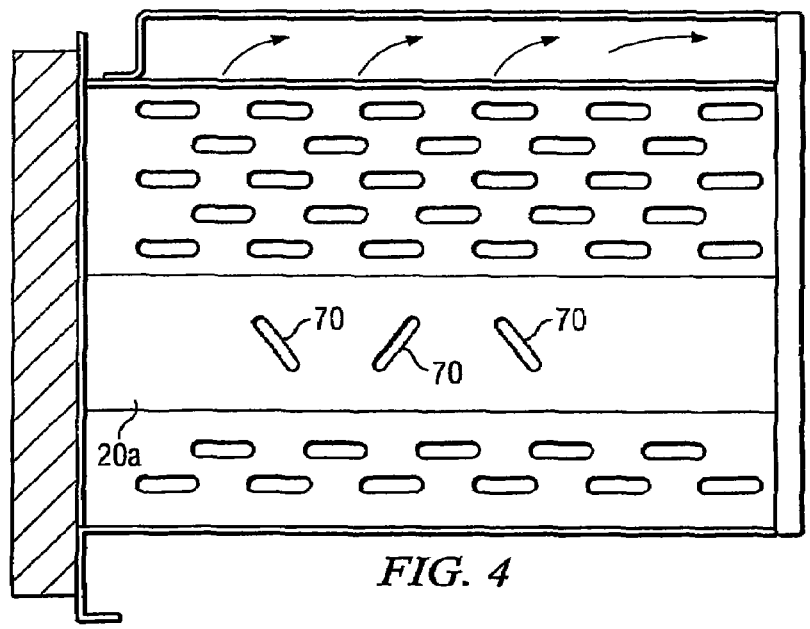
FIG. 4 is a front view of left side oven wall illustrating microwave antenna.

As shown in FIG. 1 and FIG. 6, microwave energy is broadcast from waveguides 20a, 20b, FIG. 1, and from waveguides 20a, 20b, 46a and 46b, FIG. 6, into oven cavity 2 via slotted antenna 70, FIG. 4 wherein narrow apertures, slots 70, are spaced along the waveguide. The number of slots per waveguide will vary depending upon the length of the waveguide and the depth of the oven cavity as further described herein. The distance between slots, 108, FIG. 10 has also shown to be important. Because slot antennas are an efficient means of introducing and uniformly distributing microwave energy into the cooking chamber of an oven, both front to back and side to side within the cooking chamber, this approach produces acceptable microwave energy uniformity as measured during cooking, or as measured by water rise testing. Depending on the depth of the cavity between 1 and 5 slot antennas can be placed on each side of the oven chamber.

Figure 5B:
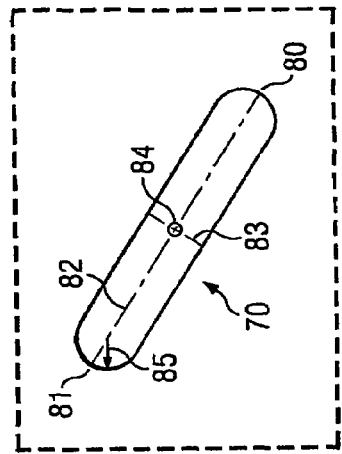
FIG. 5B is an exploded view of slot.
Figure 5A:
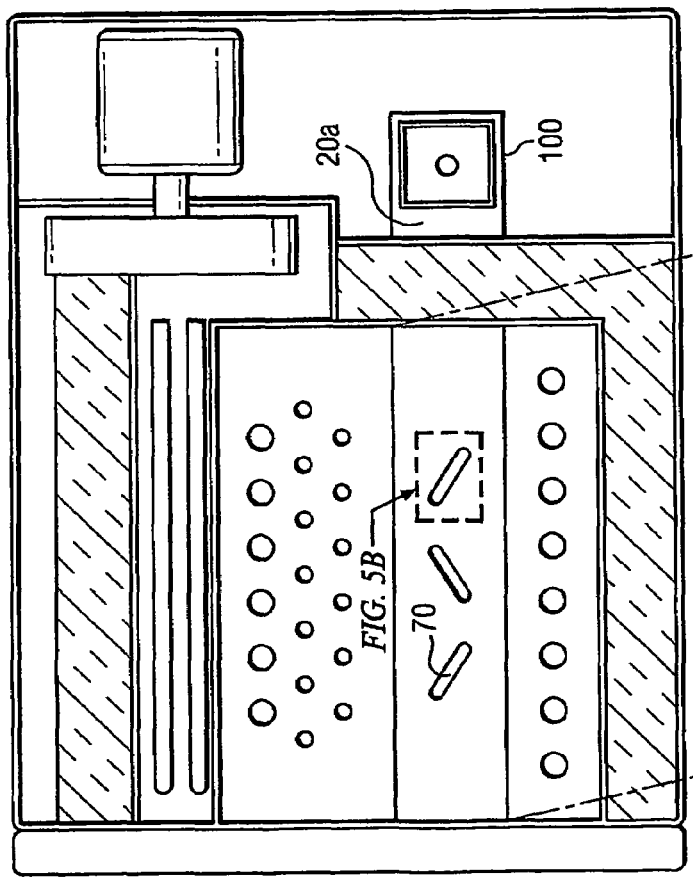
FIG. 5A is a front view of left side oven wall illustrating slot covers.

Exemplary slot 70, FIG. 5, is defined as having a proximal end 80 and a distal end 81 such that the distance between the proximal end and the distal end is defined as the slot length and is measured along longitudinal axis 82; and a slot width as measured along axis 83, wherein vertical axis 83 is perpendicular to longitudinal axis 82. Center point 84, FIG. 5 is defined as the point of intersection of the vertical axis and the longitudinal axis. Slots 70 contain a radius at the proximal and distal ends, said radius equal in length to approximately one half the distance of vertical axis 83. Slots 70 are open to the cooking chamber environment, and must be sealed to prevent food particles, water, oil, cleaning agents or other substances from being deposited within the waveguide because contamination of the waveguide interior by such substances can reduce the life of the magnetron tube, reduce the useful power produced by the tube, and/or increase heat loss from the oven. Because a speed cooling oven may operate at temperatures of up to approximately 500 degrees F., the slot antenna must be protected by a slot antenna cover 106, FIG. 5A, which must be very durable. As used herein the term "slot antenna cover" "slot antenna covers", "slot cover", "cover" and "covers" have the same meaning. Slot antenna covers 106 are configured to cover slots 70. These covers may be adhered to the waveguides using high temperature silicone rubber room temperature vulcanizing ("RTV") sealant. This sealing approach creates a high temperature watertight seal between the cover and the waveguide. The cover material must be: compatible with high temperature operation, of low loss characteristics relative to microwave transmission, easily cleanable, durable, and inexpensive. For good microwave compatibility, materials with a dielectric constant less than 6 and a loss tangent less that 0.2 is preferred. Such materials must be thin, less than 0.015 inches thick, and be suitable for adhesion using silicone rubber RTV. A Teflon, Poly(tetrafluoroethylene) ("PTFE")/fiberglass fabric such as the one produced by Saint Gobain (ChemFab material 10 BT) which has one side treated to accepted silicone rubber and is 0.01 inches thick may be used. This material has little impact on the e-fields. Water rise testing and Smith charts for the waveguide/antenna impedance (for slot angles greater than 17 degrees) with and without the cover have shown to be similar. At shallow slot angles, the covers have shown to have a small negative impact on e-field performance. The same material with a 0.002 layer of silicone rubber bonded to the PTFE/fiberglass fabric had measurable negative impact on the impedance (Smith Chart) of the microwave kit. This thin rubber layer in front of the slots pulled the microwave circuit impedance to less favorable set of conditions relative to the desired operating point of the tube. The iron oxide filler used in the high temperature silicone rubber layer was the source of this performance problem. Thin mica sheets produce good microwave performance (0.015 inches) but durability and cleaning may be of concern.

It has been found that for an oven cavity with a depth of less than 15 inches and an overall appliance depth of less than 24 inches certain design parameters for slots 70 produce optimum microwave energy distribution:

Slot Length: Approximately 2.397 inches which is less than 0.5 of free space wavelength, as illustrated 81, FIG. 5.

Slot width: Between approximately 0.25 and 0.35 inches, as illustrated 84, FIG. 5.

Spacing Between Slots: For a Waveguide Rectangular (WR) 340 waveguide, approximately 3.42 inches which is approximately 0.5 of guide wavelength, as illustrated 108, FIG. 10.

End Spacing: 3.42 inches which is 0.5 of guide wavelength, illustrated 99, FIG.10.

Angle of Slots: Between approximately 10 and 45 degrees depending upon the food load. For larger loads greater than approximately 350 grams, slot angles of greater than approximately 25 degrees is preferred. For general speed cooking, slot angles greater than 20 degrees and for light loads that are approximately 250 grams or less where speed of cooking is critical, shallow angles at approximately 12-15 degrees are preferred.

Number of Slots: Depending upon the depth of the oven cooking cavity, between 1 and 5 slot antenna may be utilized per waveguide and it has been found that 3 slots produce optimum microwave energy distribution in ovens with cooking cavity depth (front to back) of less than 15 inches.

Slot Orientation: To energize the slots in phase and produce a directional pattern with maximum electromagnetic radiation broadcast to each waveguide, slots 70 having alternating angles of orientation with the front slot (slot toward the front wall 7 of oven 2) is inclined such that the slot end nearest front wall 7 is inclined at an angle greater than zero, 98, FIG. 10, along the waveguide horizontal axis 96, FIG. 10.

Slot End Radius: Approximately 0.5 of slot width, as illustrated 99, FIG. 10.

Food product 10, FIG. 1 and 10a, 10b FIG. 6 is placed within oven cavity 2 a distance of at least 2.4 inches (for optimal cooking uniformity) from left side wall 5 and right side wall 6. The 2.4 inch measurement corresponds to one half a microwave wavelength or 2.4 inches (for optimal cooking uniformity) (E field null) for a 2.45 GHz microwave tube frequency. This spacing permits the E-field 51a and 51b FIG. 3, (illustrated in single rack), to expand and become more uniform prior to coupling with the food product. Similar e-field distribution occurs in multiple rack oven such as the two rack oven of FIG. 6.

During those times when the cooking cavity is not heavily loaded with food, is not loaded at all, or when the loading has a small food load placed off cavity center, the microwave energy emitted from the slot antennas from waveguide 20a, FIG. 1, and 20a, 46a FIG. 6 may produce a negative effect on the e-fields produced by opposite waveguide 20b, FIG. 1, or 20b, 46b, FIG. 6. This interference can produce magnetron operating instabilities that can damage the magnetron. It is therefore beneficial to reduce the effect of slot antenna radiation interference, hereinafter referred to as "line of sight slot antenna interference" from the interactions of waveguide 20a with 20b, FIG. 1 and 20a with 20b FIG. 6 and 46a with 46b, FIG. 6. Such instability starts with the E and H fields in a waveguide and their interaction with the waveguide. Within the waveguides walls there exist directions of flow of electromagnetic energy where a slot, cut parallel to the flow lines, will not interrupt the electromagnetic energy. These slots are "non-radiating" slots. However, if a slot such as to interrupt the current flow lines, the currents have to go around the slot which create a distortion of the electric field and magnetic field patterns inside the waveguide and a voltage difference between opposite edges of the slot occurs in the middle of the slot. The slot therefore acts as a dipole antenna and will radiate, and the microwave energy leaks out from the waveguide. If the beam (E and H fields) from the slot antenna are influenced by another beam, it can disrupt the current flow lines within the waveguide. This disruption can have the effect of pulling the magnetron tube into an unstable performance zone. Effectively, the impedance of the tube is no longer matched to that antenna and waveguide. When this disruption occurs the magnetron may mode, arc, or otherwise fail to operate properly.

Figure 8:
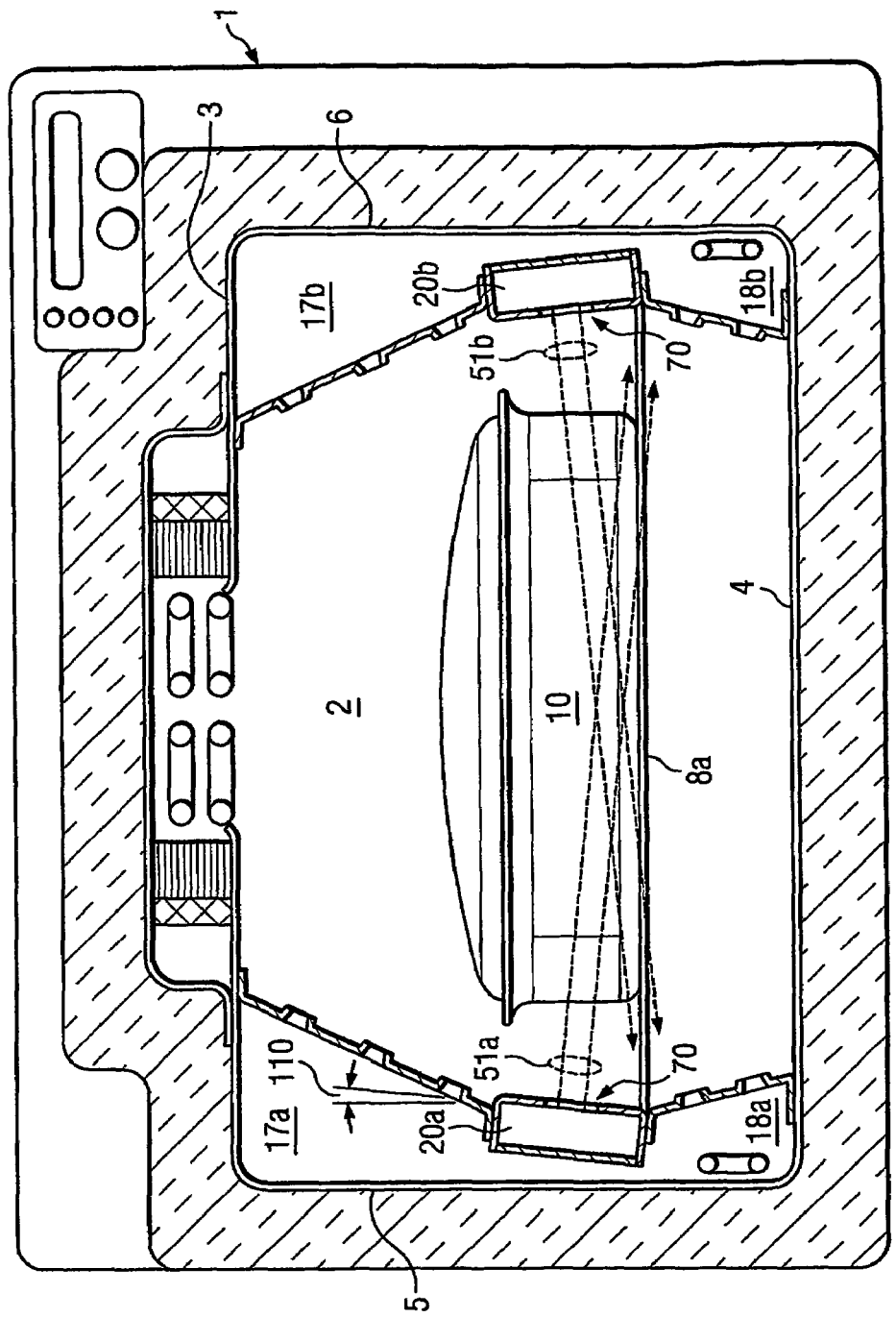
FIG. 8 is a front view of oven cavity illustrating angled waveguides.

To reduce line of sight slot antenna interference the waveguides containing slotted antenna 70 may be tilted or angled either up towards the oven roof or down towards the oven floor, FIG. 8. By tilting the waveguide, the slotted antenna on one side wall of the cooking cavity no longer has a direct line of sight with the slotted antenna located on the opposing oven cavity side wall. For example, tilting waveguide 20a, 20b, FIG. 1, FIG. 6, containing slot antennas 70 by, for example, 10 degrees, illustrated as angle of inclination 110, FIG. 8, eliminates line of sight slot antenna interference with waveguide 20b. In addition to minimizing the interference of opposing slotted antennas, there is the added benefit of more efficient coupling of the microwave energy to the food product when the beams are directed towards the food.

Figure 9:
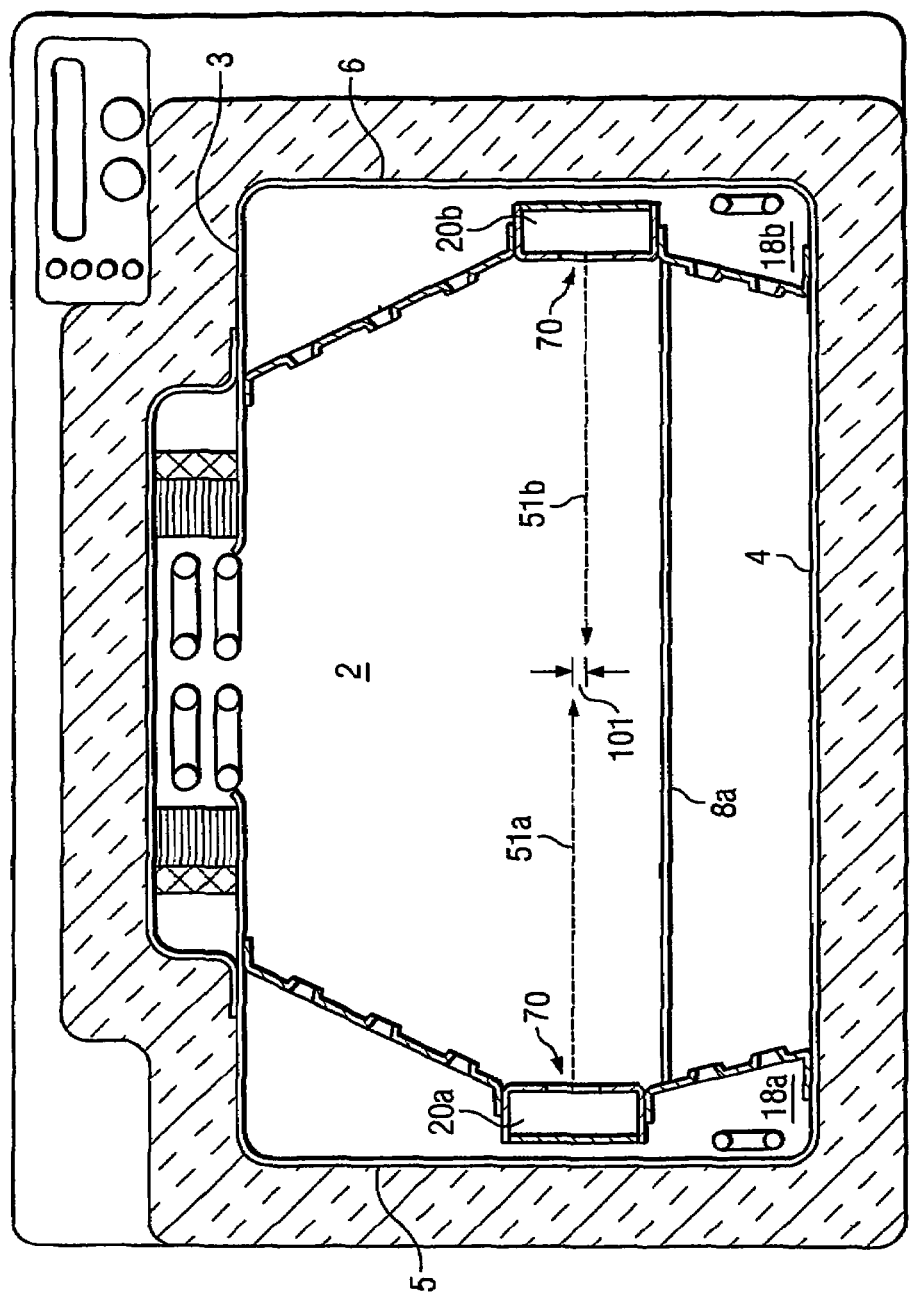
FIG. 9 is a front view of oven cavity illustrating vertically displaced waveguides.

A second method to reduce the influence of line of sight slot antenna interference is to vertically offset left waveguide 20a from right waveguide 20b, FIG. 9. This may be accomplished by lowering right waveguide 20b, so that waveguide 20a is above the height of waveguide 20b. Alternatively, of course, waveguide 20b may be raised, or alternatively waveguide 20a may be lowered or raised in order to accomplish the desired offset of waveguides 20a and 20b, FIG. 9. The same method may be utilized with the multiple rack oven and the upper waveguides 46a and 46b, FIG. 6. An offset of the waveguides of approximately 1.2 inches, 101, FIG. 9 (about one quarter wavelength) has been found to be effective at reducing such interferences. The electromagnetic energy of waveguide 20a, shown graphically as 51a, FIG. 3, FIG. 9 is therefore offset from the electromagnetic energy, 51b, FIG. 3, FIG. 9 of waveguide 20b.

Another method of reducing line of sight slot antenna interference is to provide slotted antennas having different angles of inclination, FIG. 10. For example, left hand waveguide 20a, FIG. 10 with slotted antenna 70 may have slot angle 98 of 15 degrees, FIG. 10 with the slot furthest from the magnetron (nearest the front wall) having an upwards or positive pitch. Right hand waveguide 20b, FIG. 10 may have incline slot angle 97 of 20 degrees with a downward or negative pitch. The slot antennas of waveguide 20a are no longer in alignment with the slot antennas of waveguide 20b and the electromagnetic energy beams are twisted relative to each other. In addition to minimizing the interference of opposing slotted antennas, this method also has a benefit relative to providing more uniform microwave coverage over the cooling surface as the beams from opposing walls now illuminate with different patterns (beam orientations). Incline slot antennas 70 are practiced with alternating angle patterns as shown in FIG. 10.

Figure 11:
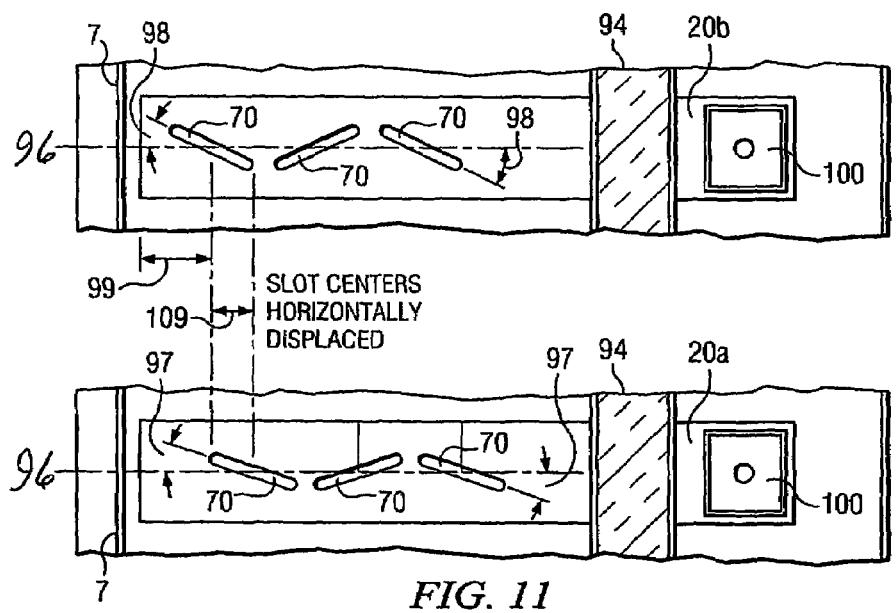
FIG. 11 is a front view of left and right side waveguides illustrating horizontally displaced slot antenna.

Yet another method to reduce line of sight slot antenna interference is to horizontally displace, FIG. 11, the left side slots 70, from the right side slots. For example, the left hand wall slotted antennas may have slot locations that are horizontally displaced relative to slot locations on the right hand wave guide by one quarter wavelength (about 1.2 inches), see 109, FIG. 11. In addition to minimizing the interference of opposing slotted antennas, this method also has a benefit relative to providing more uniform microwave coverage over the cooking surface as the beams from opposing walls now illuminate with different patterns (beam orientations).

The above mentioned methods may be combined in any combination as means to reduce the influence the microwave energy beams generated from one side of the oven from influencing the stability of the antennas beams positioned on opposing oven side walls.

During light or no load conditions one or both tubes may experience stability problems. The anode current from the unstable tube(s) will no longer be in the acceptable operating range. For example, if the anode current for a normally operating tube is about 350 milliAmps direct current ("DC"), then a tube powering a waveguide experiencing antenna interference may have an anode current rating below 250 milliamp DC. Detection of an abnormal anode current draw and turning the power off to either the right side or left side magnetrons eliminates the instability. The detection-control methods include current sensors to measure the anode current between the high voltage diode and ground and a power relay to switch off current to either high voltage transformers (that power the magnetrons) when abnormal anode current is detected.

The reduction in microwave power associated with the switching of a tube will require cooking time modifications or termination of the cook cycle to prevent under cooking of a food product. If a tube is switched off to avoid instability, then the microwave power settings used in the cooking recipe may be modified by controller 34, FIG. 1 by increasing the power level of the operating tube (e.g., from approximately 30 percent to approximately 60 percent), by adding a microwave only event to compensate for single tube operation, or a combination of increased power setting and new microwave only events.

Because waveguides 20a and 20b, FIG. 1, FIG. 6 are located on the left and right side walls of the oven, the waveguides do not interfere with oven cavity spent gas exhaust, and are not affected by food spills, grease contamination, cleaning fluid contamination or other contamination that normally affect a bottom launch microwave system. The microwave system of the present invention will therefore be less likely to be penetrated by grease, spills, cleaning materials and other contaminants because the systems are not located directly under the food product where hot contaminants will drip. As seen in FIG. 1 and FIG. 6, bottom wall 4 has a smooth, continuous bottom that is easy to clean with no heating elements, air return ducts or microwave launchers within the oven cavity floor. In instances where air return means, heating elements and microwave launchers protrude through the oven floor it is very difficult for an operator to clean and maintain the oven in a sanitary condition. In a bottom launch microwave system, the waveguide launcher is generally located within the center portion of the oven cavity bottom wall. As grease, oils and other by-products of the cooking process are released during normal cooking, they drip and splatter onto the microwave launcher. The launcher must be protected and is covered with a microwave transparent material such as quartz and sealed with adhesives or other sealants in an effort to prevent contaminants from entering the launcher, causing pre-mature breakdown of the magnetron. Additionally, some speed cook ovens have located upon the bottom wall a radiant element to assist with bottom side browning. For commercial applications an exposed lower radiant element may result in safety issues as grease builds up around the hot element. Gas discharge plates 27a and 27b, FIG. 1, FIG., 6, are located in the corners of the oven with the apertures 29a, 29b located above the oven floor. Apertures 29a and 29b are positioned above oven bottom wall 4 and cleaning of the oven floor is therefore easily achieved. Additionally, plates 27a and 27b can be manufactured to be removable from lower gas transfer sections 18a and 18b for cleaning or replacement.

To summarize, the present single rack and multi rack speed cooking inventions provides for a speed cooking oven utilizing hot gas flows, hot gas flows coupled with microwave energy in order to achieve speed cooking of food products five to ten times faster than conventional cooking methods, and at quality, taste and appearance levels that are equal to and exceed conventional cooking. In the various versions, the oven is operable on standard commercial power supplies and is simple and economical to manufacture, use and maintain, and is directly scalable to larger or smaller commercial and larger or smaller residential embodiments. The speed cooking oven may operate as a speed cooking air only oven, a microwave oven or a combination air and microwave speed cooking oven.

Although the present invention has been described in considerable detail with reference to certain preferred versions thereof, other versions are possible. For example, various sizes of commercial and residential speed cooking ovens may be made. In these cases larger or smaller component parts may be utilized and fewer or more components may be employed. In the case where it is desirable to make a smaller speed cooking oven, one gas flow acceleration means may be utilized instead of two; one microwave system utilized instead of two; smaller or fewer thermal devices, whether electric resistance or gas fired may be used. In cases wherein it is desirable for a larger speed cooking oven, multiple rack units may be developed and additional gas flow systems and microwave systems may be added to accomplish a larger cavity, multi rack speed cooking oven. Apertures may be made larger or smaller depending upon the gas flow requirements of a practiced version. The heating means may be combined into one heating element, or more than two heating elements may be utilized.

Upon entry into the United States, any element in a claim that does not explicitly state "means for" performing a specific function, or "step for" performing a specific function, is not to be interpreted as a "means" or "step" clause as currently specified in U.S. law, 35 U.S.C. Section 112, Clause 6. In particular, the use of "step of" in the claims herein is not intended to invoke the provisions of 35 U.S.C. Section 112.

Other modifications and improvements thereon will become readily apparent to those skilled in the art Accordingly, the spirit and scope of the present invention is to be considered broadly and limited only by the appended claims, and not by the foregoing specification.

I claim:

1. A speed cooking oven for cooking a food product by hot gas and microwave energy, comprising:
    an oven cavity having opposing sides;
    at least one cooking rack;
    means for launching hot gas into the oven cavity from said opposing sides of the cavity;
    at least one magnetron for generating microwaves;
    at least two rectangular waveguides operably associated with the at least one magnetron, at least one of the at least two waveguides having a proximal end near the magnetron, an opposing distal end, and a longitudinal waveguide axis;
    at least one slot in each waveguide having a center point disposed along a longitudinal slot axis, the center point being located a selected distance from the distal end of the waveguide, the slot having a slot length along said longitudinal slot axis that is less than 0.5 free space wavelength;
    wherein the at least one slot in each waveguide is configured such that a substantially uniform microwave pattern is achieved without using a mechanical phase-altering device; and
    wherein said waveguides are configured for launching microwave energy through respective slots and into the oven cavity from opposing sides of the cavity.

2. The speed cooking oven according to claim 1, wherein each slot is defined by a pair of elongated parallel sides connected at each end by semicircular ends, each slot having a vertical slot axis perpendicular to the longitudinal slot axis, such that the center point is located at the intersection of the longitudinal slot axis and the vertical slot axis.

3. The speed cooking oven according to claim 1, wherein each waveguide includes first, second, and third slots.

4. The speed cooking oven according to claim 3, wherein the selected distance of the center point of the first slot opening is 0.5 of the waveguide wavelength.

5. The speed cooking oven according to claim 3, wherein each slot has a width between about 0.25 inches and 0.35 inches.

6. The speed cooking oven according to claim 5, wherein the first slot is inclined relative to the longitudinal waveguide axis, such that the end of the first slot closest to the distal end of the waveguide is higher than the other end of the first slot.

7. The speed cooking oven according to claim 6, wherein the angle of incline of the first slot is between about 10 and 45 degrees.

8. The speed cooking oven according to claim 7, wherein the spacing between each slot is along the longitudinal waveguide axis 0.5 of the waveguide wavelength.

9. The speed cooking oven according to claim 8, wherein the second slot is oriented at 90 degrees from the first slot.

10. The speed cooking oven according to claim 9, wherein the third slot is oriented at 90 degrees from the second slot.

11. The speed cooking oven according to claim 10, wherein each longitudinal waveguide axis is located between about 0.5 and 2.0 inches above a corresponding cooking rack.

12. The speed cooking oven according to claim 7, wherein the spacing between the center points of the first, second and third slots along the longitudinal waveguide axis is approximately 3.42 inches.

13. The speed cooking oven according to claim 1, further comprising:
    a means for reducing interference between e-fields emitted through slots of said waveguides.

14. The speed cooking oven according to claim 13, wherein the means for reducing interference between e-fields is inwardly canted waveguides.

15. The speed cooking oven according to claim 13, wherein the means for reducing interference between e-fields is vertically offset waveguides.

16. The speed cooking oven according to claim 13, wherein the means for reducing interference between e-fields is slots in the waveguides that are offset along the longitudinal axes of the waveguides.

17. The speed cooking oven according to claim 13, wherein the means for reducing interference between e-fields is a control system for selectively adjusting the power outputs of the magnetrons.

18. The speed cooking oven according to claim 3, wherein the selected distance of the center point of the first slot is 3.42 inches.

19. A speed cooking oven as set forth in claim 1 further comprising a gas re-circulating system for re-circulating gas through said oven cavity.

20. The speed cooking oven as set forth in claim 1 wherein the at least one slot is inclined relative to the longitudinal axis of the waveguide.

21. The speed cooking oven as set forth in claim 1 wherein the center point of said at least one slot is disposed along the longitudinal waveguide axis.

22. The speed cooking oven according to claim 1, wherein the hot gas launching means comprises first and second gas transfer sections.

23. The speed cooking oven according to claim 22, wherein the hot gas launching means further comprises third and fourth gas transfer sections.

24. The speed cooking oven according to claim 23, wherein the first gas transfer section is above the third gas transfer section, and the second gas transfer section is above the fourth gas transfer section, when the oven is upright.

25. A speed cooking oven for cooking a food product by hot gas and microwave energy, comprising:
    an oven cavity having opposing sides;
    at least one cooking rack;
    means for launching hot gas into the oven cavity from said opposing sides of the cavity;
    at least one magnetron for generating microwaves;
    at least two rectangular waveguides operably associated with the at least one magnetron, at least one of the at least two waveguides having a proximal end near the magnetron, an opposing distal end, and a longitudinal waveguide axis;

at least one slot in each waveguide having a center point disposed along a longitudinal slot axis, the center point being located a selected distance from the distal end of the waveguide; and a thin, non-breakable slot cover for sealing the slots;

wherein the at least one slot is configured such that a substantially uniform microwave pattern is achieved without using a mechanical phase-altering device; and wherein said waveguides are configured for launching microwave energy through respective slots and into the oven cavity from opposing sides of the cavity.

26. The speed cooking oven according to claim 25, wherein slot cover is formed from polytetraflouroethylene.

27. The speed cooking oven according to claim 25, wherein slot cover is formed from a fiberglass material.

28. The speed cooking oven according to claim 25, wherein slot cover is formed from mica sheets.

29. The speed cooking oven according to claim 25, wherein slot cover is adhered to the waveguide by a silicone rubber material.

30. The speed cooking oven as set forth in claim 25 wherein the center point of said at least one slot is disposed along the longitudinal waveguide axis.

31. A speed cooking oven for cooking a food product by hot gas and microwave energy, comprising:

an oven cavity having opposing sides;

at least one cooking rack;

means for launching hot gas into the oven cavity from said opposing sides of the cavity;

at least one magnetron for generating microwaves;

at least two opposing rectangular waveguides operably associated with the magnetron, at least one of the at least two waveguides having a proximal end near the magnetron, an opposing distal end, and a longitudinal waveguide axis;

at least one slot opening in each waveguide having a center point disposed along a longitudinal slot axis, the center point being located a selected distance from the distal end of the waveguide;

wherein the at least one slot is configured such that a substantially uniform microwave pattern is achieved without using a mechanical phase-altering device; and wherein said waveguides are configured for launching microwave energy through respective slots and into the oven cavity from opposing sides of the cavity.

32. The speed cooking oven according to claim 31, wherein the opposing waveguides are canted inwardly, so as to reduce interference between e-fields emitted through the slots of the opposing waveguides.

33. The speed cooking oven according to claim 31, wherein the opposing waveguides are vertically offset, so as to reduce interference between e-fields emitted through the slots of the opposing waveguides.

34. The speed cooking oven according to claim 31, wherein the slots in opposing waveguides are offset along the longitudinal waveguide axes of the opposing waveguides, so as to reduce interference between e-fields emitted through the slots of the opposing waveguides.

35. The speed cooking oven according to claim 31, further comprising:

a control system for selectively adjusting the power outputs of the at least one magnetron.

36. The speed cooking oven according to claim 31, further comprising:

a thin, non-breakable slot cover for sealing the slots of each waveguide.

37. The speed cooking oven as set forth in claim 31 wherein the center point of said at least one slot is disposed along the longitudinal waveguide axis.

38. A speed cooking oven for cooking a food product by hot gas and microwave energy, comprising:

an oven cavity having opposing sides;

at least one cooking rack;

means for launching hot gas into the oven cavity from said opposing sides of the cavity;

a single magnetron for generating microwaves;

at least two rectangular waveguides operably associated with the single magnetron, the waveguides having proximal ends near the magnetron, opposing distal ends, and longitudinal waveguide axes;

at least one slot in each waveguide having a center point disposed along a longitudinal slot axis, the center points being located selected distances from the distal ends of respective waveguides, the slots having slot lengths along respective longitudinal slot axes that are less than 0.5 free space wavelength;

wherein the at least one slot in each waveguide is configured such that a substantially uniform microwave pattern is achieved without using a mechanical phase-altering device; and wherein said waveguides are configured for launching microwave energy through respective slots and into the oven cavity from opposing sides of the cavity.

39. The speed cooking oven as set forth in claim 38 wherein the center point of said at least one slot is disposed along the longitudinal waveguide axis.

40. A speed cooking oven for cooking a food product by hot gas and microwave energy, comprising:

an oven cavity having opposing sides;

at least one cooking rack;

means for launching hot gas into the oven cavity from said opposing sides of the cavity;

at least one magnetron for generating microwaves;

at least two rectangular waveguides operably associated with the at least one magnetron;

at least one slot in each waveguide;

wherein the at least one slot in each waveguide is configured such that a substantially uniform microwave pattern is achieved without using a mechanical phase-altering device; and wherein said waveguides are configured for launching microwave energy through respective slots and into the oven cavity from opposing sides of the cavity.

* * * * *